Dec. 3, 1940.                R. ANNEN                2,223,799

MACHINING METHOD OF THE RACES OF BALL BEARINGS

Filed Aug. 29, 1938

R. Annen
Inventor

By
Glascock Downing & Seebold
Attys.

Patented Dec. 3, 1940

2,223,799

UNITED STATES PATENT OFFICE 2,223,799

MACHINING METHOD OF THE RACES OF BALL BEARINGS

Robert Annen, Bienne, Switzerland, assignor to the firm Roulements a Billes Miniatures S. A., Bienne, Switzerland, a joint-stock company of Switzerland Application August 29, 1938, Serial No. 227,432 In Switzerland September 4, 1937

2 Claims. (Cl. 80—5)

The present invention relates to a method for machining the races of ball bearings. By this method balls similar to those of the finished bearing are rolled on said races under great pressure.

The balls impart the true form to the races in accordance with the various needs.

In a preferred embodiment of the invention the inner and outer track rings are first turned and then the races roughly marked. For very small bearings this marking of the races is not necessary.

In most cases the races rolled according to the present invention need no grinding and polishing. The form and location of the races obtained by the method claimed become more exact than by grinding and polishing, for, when rolled according to the method claimed, the races are sufficiently polished and have acquired their exact geometrical form.

Most frequently the rings, after hardening, need no further machining. It suffices to use special steels which do not become deformed by the usual thermical treatment.

Figs. 1 to 4 of the accompanying drawing show, as examples, some embodiments of the method according to the invention. The tools are all shown by vertical sectional views in planes laid through the axes of the bearings.

Figure 1:
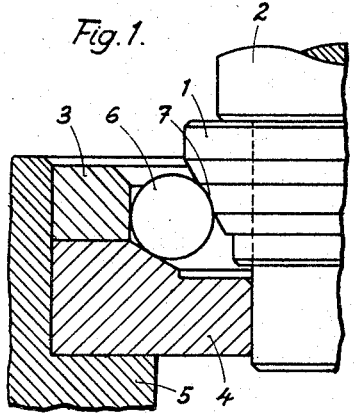

In Fig. 1 the inner cone 1 on whose surface a race has to be formed is slid over shaft 2 which rotates with this cone, while the guide rings 3 and 4, which form part of the tool, remain stationary. These rings are held by a support plate 5. By an axial pressure exerted on shaft 2 the balls 6, while rolling on the surface of the cone, gradually impress thereon a circular groove 7, the depth of which is limited by means of a non-represented stop upon which shaft 2 comes to rest.

Figure 2:
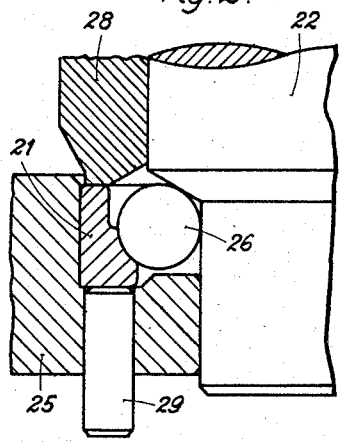

Fig. 2 illustrates how the race of an exterior ring of an oblique ball bearing is machined. This ring 21 is held fast in a stationary plate 25 by a sleeve 28. The rotary shaft 22, carrying along the balls 26, maintains these balls in their position. If a pressure in an axial direction is exerted on this shaft, the balls machine the race of ring 21. The axial stop of the shaft is not shown. Pins 29 serve as expelling means for ring 21 when the machining has been completed and shaft 22 and sleeve 28 have been removed.

Figure 3:
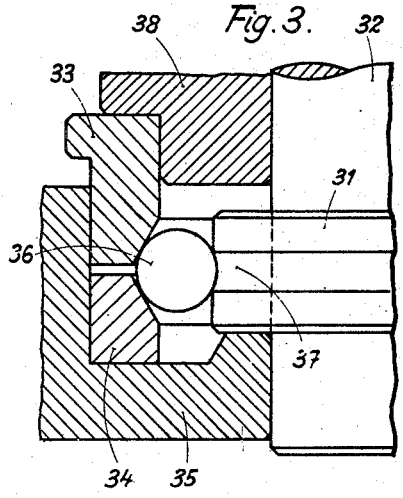

The tool shown in Fig. 3 is used for machining the inner rings of radial ball bearings. The rotary shaft 22 carries ring 31 along with it, while ring 34 is held fast in the support plate 35, and another ring 33, rigidly fast to a sleeve 38, is slidably arranged in an axial direction to press the balls 36 against the ring 31, thereby machining the race 37.

Figure 4:
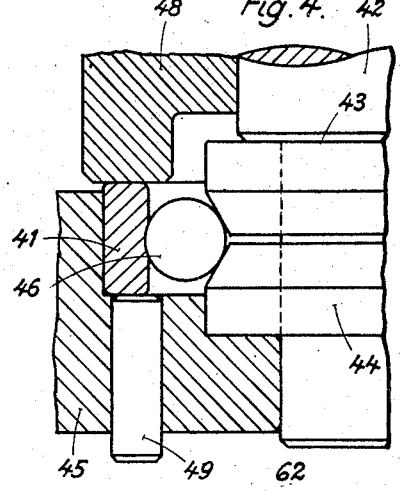

In Fig. 4 the machining of the outer ring 41 of a radial ball bearing is represented. The operating is similar to that shown in Fig. 2. Shaft 42 carries rings 43 and 44 along with it and likewise the balls 46. Sleeve 48 slidably arranged in an axial direction maintains the ring 41 in its machining position. Pin 49 serves as expelling means for ring 41.

What I claim is:

1. A method of rolling the races of ball bearings by which balls are rolled on said races and pressed against the work-piece by means of two surfaces, each being produced by the revolution of a straight line.

2. A method according to claim 1 by which, for the determination of location and depth of the races, the moving of a ring with a surface produced in revolution is stopped by another ring with a surface produced in revolution, while the mutual position of the work-piece and one of the surfaces produced in revolution is unchanged.

ROBERT ANNEN.